J. W. INNIS.
Potato-Digger.
No. 62,271. Patented Feb. 19, 1867.
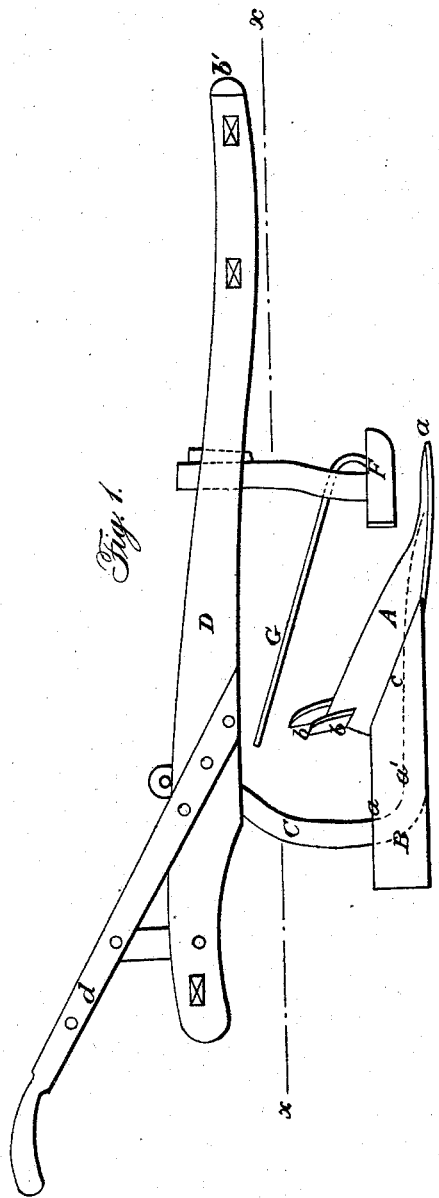
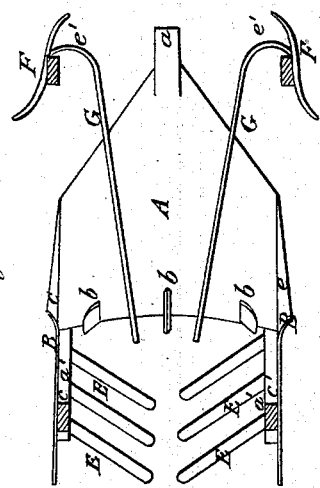
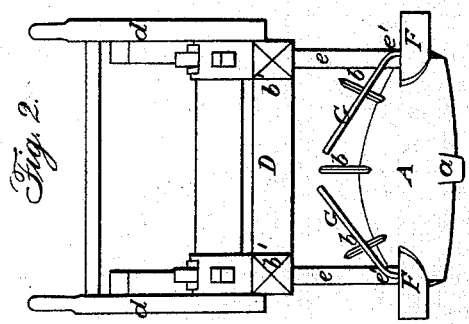
Witnesses:
J. W. Innis
Inventor:
J. W. Coomby
Geo. Reed

United States Patent Office.

JAMES W. INNIS, OF NEWBURG, NEW YORK.

Letters Patent No. 62,271, dated February 19, 1867.

IMPROVEMENT IN POTATO DIGGER.

The Schedule referred to in these Letters Patent and making part of the same.

TO ALL WHOM IT MAY CONCERN:

Be it known that I, JAMES W. INNIS, of Newburg, in the county of Orange, and State of New York, have invented certain new and useful Improvements in Potato Diggers; and I do hereby declare that the following is a full, clear, and exact description of the same, reference being had to the accompanying drawings, making a portion of this specification, in which—

Figure 1 is a side elevation of a potato digger constructed according to my invention.
Figure 2 is an end view of the same, looking from the front thereof.
Figure 3 is a horizontal transverse section of the same, taken in the line $x\,x$ of fig. 1.
Similar letters of reference indicate corresponding parts in all the figures.

This invention consists in two series of raking-blades, so arranged in rear of the shovel plough of a potato digger as to effectually rake the potatoes from the soil, and deposit them upon the surface thereof. The invention also consists in a shovel plough constructed with its rearmost portion rounded or convex, and furnished with cutters, in such manner as to break or pulverize the soil as it passes over the aforesaid shovel plough, whereby the operation of the raking-blades in raking the potatoes from the soil is greatly facilitated. The invention further consists in a novel means of removing the soil from the sides of the potato hills or drills, as the case may be, and insuring, at the same time, the proper discharge of the potato tops from the machine; and furthermore, in a novel arrangement of parts whereby any clogging of the machine when in operation is effectually prevented.

To enable others to understand the construction and operation of my invention, I will proceed to describe it, with reference to the drawings.

A represents a shovel plough, the forward portion of which is made of tapering form, as shown more clearly in fig. 3, and terminates in a point, $a$, while the rearmost portion thereof is made rounded or convex in its cross-section, and furnished with any desired or suitable number of upwardly projecting cutters $b$, the office of which is to break or pulverize the soil as it passes over the aforesaid shovel plough, in order to facilitate the action of the raking-blades in bringing the potatoes to the surface of the ground, as will be hereinafter fully set forth. B indicates two runners, which extend back from the sides of the shovel plough A, and which serve to support the rearmost portion of the machine. The forward portion of these runners extends upward beyond the lateral edges of the shovel plough, and constitutes the side pieces thereof, as shown at $c$. The runners B, and also the shovel plough A, are secured to the lowermost portions of two supporting-braces C, which are curved, as shown more clearly in dotted lines at $a'$, in fig. 1, and are secured at their upper ends to the frame D, which may be of wood, and of any suitable construction, the said frame D being furnished with two handles $d$, by means of which the digger, when in operation, may be guided in substantially the same manner as an ordinary plough or cultivator, the horse or other draught animal being attached to the forward end $b'$, of the aforesaid frame, in any suitable manner. Secured in a nearly horizontal position upon the lower or horizontal portion of each of the curved supporting-braces C, at the inner side thereof, is a series consisting of any desired or suitable number of inwardly-projecting raking-blades E. These blades E slant backwards, or, in other words, are situated at an angle to the portions to which they are attached of the curved supporting-braces C, as represented in fig. 3, the two series of raking-blades being thus situated opposite each other in rear of the shovel plough. The blades of each series are placed at such a distance apart as to allow the soil pulverized by passing over the shovel plough A to pass through the spaces between them, but not to allow the passage of the potatoes. The said blades, furthermore, have their upper sides or surfaces made to slope downward and forward, and each blade is placed a little higher than the one in front of it, in such manner that the potatoes will be gradually raised up during the operation of digging, as will be hereinafter fully set forth. Situated in advance of the shovel plough A are two vertical bars or standards $e$, the upper ends of which are fixed in the frame D, near the sides or lateral edges thereof, and to the lower extremities of which are secured supplemental shares F, the office of which is to remove the soil from the sides of the potato hills in advance of the shovel plough A, as will be hereinafter further explained. Attached to each of the supplementary shares F, or to the standards $e$ thereof, is a rearwardly extending rod, G, which is curved, as shown at $c'$. These rods G, as they extend back, approach or are inclined toward each other, as represented more plainly in figs. 2 and 3, the said rods being designed to secure the proper passage of the potato "tops" or stalks over the middle portion of the shovel plough when the digger is in operation. As the digger is drawn forward, guided by the handles $d$, as hereinbefore explained, the supplemental shares F remove and throw outward the soil from the sides of the "row" of potato hills, at the same time that the potato tops or stalks pass between the rods G, in order that they may be gathered inward over the middle portion of the shovel plough as the latter is drawn along. The forward movement of the said shovel plough then causes it to pass underneath the "row" or "hills," and thus lift the soil composing the same, which, passing over the aforesaid plough, falls from the rearmost end thereof upon the raking-blades D, being broken and pulverized in its passage over the plough by the upright breaking-cutters $b$, attached to the rearmost portion of the same. The broken and pulverized soil then passes through the spaces between the raking-blades D, while the potatoes, passing over them, are gradually raised up, and fall from the rearmost of the said blades upon the surface of the ground, the potatoes being, as it were, raked from the loose soil by the aforesaid raking-blades. The potato tops, being guided toward the middle of the plough A as it is drawn along, as hereinbefore mentioned, pass over the rearmost end thereof, and are deposited upon the ground.

What I claim as my invention, and desire to secure by Letters Patent, is—

1. The two series of raking-blades E, arranged opposite each other in rear of the shovel plough, substantially as herein set forth for the purpose specified.

2. The shovel plough constructed with its rear portion rounded or convex, and furnished with breaking-cutters $b$, substantially as herein set forth for the purpose specified.

3. The supplementary side-shares F, and curved rearwardly extending rods G, arranged with reference to each other, and to the shovel plough, substantially as herein set forth for the purpose specified.

4. The supporting-braces C, constructed with curved portions $a'$, and arranged in relation with the runners B, shovel plough A, and the raking-blades E, substantially as herein set forth for the purpose specified.

J. W. INNIS.

Witnesses:
    A. LE CLERC,
    J. W. COOMBS.